(12) United States Patent
Johnson et al.

(10) Patent No.: US 10,634,530 B2
(45) Date of Patent: Apr. 28, 2020

(54) AIR DATA PROBE WITH IMPROVED PERFORMANCE AT ANGLE OF ATTACK OPERATION

(71) Applicant: Rosemount Aerospace, Inc., Burnsvile, MN (US)

(72) Inventors: Paul Robert Johnson, Prior Lake, MN (US); Aaron A. Cusher, Eagan, MN (US); Timothy Thomas Golly, Lakeville, MN (US); Brian Daniel Matheis, Lakeville, MN (US); Greg Seidel, Farmington, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 91 days.

(21) Appl. No.: 15/882,068

(22) Filed: Jan. 29, 2018

(65) Prior Publication Data

US 2018/0149501 A1 May 31, 2018

Related U.S. Application Data

(62) Division of application No. 14/665,007, filed on Mar. 23, 2015, now Pat. No. 10,281,303.

(51) Int. Cl.
*G01F 1/46* (2006.01)
*G01P 5/165* (2006.01)
*B64D 45/00* (2006.01)

(52) U.S. Cl.
CPC ............... *G01F 1/46* (2013.01); *B64D 45/00* (2013.01); *G01P 5/165* (2013.01)

(58) Field of Classification Search
None
See application file for complete search history.

(56) References Cited

U.S. PATENT DOCUMENTS

| | | | |
|---|---|---|---|
| 2,554,634 A | 5/1951 | Paine et al. |
| 3,482,445 A | 12/1969 | DeLeo et al. |
| 3,514,999 A | 6/1970 | Mejean et al. |
| 4,000,647 A | 1/1977 | Tauchmann |
| 4,121,088 A | 10/1978 | Doremus et al. |
| 4,154,256 A | 5/1979 | Miller |
| 4,718,273 A | 1/1988 | McCormack |
| 4,730,487 A | 3/1988 | DeLeo et al. |
| 5,043,558 A | 8/1991 | Byles |
| 5,062,869 A | 11/1991 | Hagen |

(Continued)

FOREIGN PATENT DOCUMENTS

| | | |
|---|---|---|
| EP | 1457765 A1 | 9/2004 |
| EP | 1764593 A2 | 3/2007 |
| EP | 2728364 | 5/2014 |

OTHER PUBLICATIONS

European Search Report for European Application No. 16162062.0 dated Sep. 16, 2016.

(Continued)

*Primary Examiner* — Harshad R Patel
(74) *Attorney, Agent, or Firm* — Carlson, Gaskey & Olds, P.C.

(57) ABSTRACT

An air data probe has a pitot tube with a tap at a forward end that defines an inner flow path. The inner flow path decreases in the cross-sectional area until reaching a throat. The inner flow path has cross-sections that are generally cylindrical and also has sections of removed material.

6 Claims, 5 Drawing Sheets

(56) References Cited

U.S. PATENT DOCUMENTS

| | | | |
|---|---|---|---|
| 5,302,026 | A | 4/1994 | Phillips |
| 5,319,970 | A | 6/1994 | Peterson et al. |
| 5,337,602 | A | 8/1994 | Gibson |
| 5,466,067 | A | 11/1995 | Hagen |
| 5,628,565 | A | 5/1997 | Hagen et al. |
| 6,070,475 | A | 6/2000 | Muehlhauser et al. |
| 6,430,996 | B1 | 8/2002 | Anderson et al. |
| 8,383,985 | B2 | 2/2013 | Twelves, Jr. et al. |
| 2004/0177683 | A1* | 9/2004 | Ice .................. G01K 13/02 73/170.02 |
| 2015/0059465 | A1 | 3/2015 | Leblond et al. |

OTHER PUBLICATIONS

Partial European Search Report for European Application No. 16162062.0 dated Jun. 1, 2016.
Partial European Search Report for EP Application No. 19182404.4 dated Oct. 8, 2019.

* cited by examiner

US 10,634,530 B2

AIR DATA PROBE WITH IMPROVED PERFORMANCE AT ANGLE OF ATTACK OPERATION

CROSS REFERENCE TO RELATED APPLICATION

This application is a divisional of U.S. patent application Ser. No. 14/665,007 filed Mar. 23, 2015.

BACKGROUND OF THE INVENTION

This application relates to an air data probe for use in aircraft applications wherein its performance is improved during certain operational conditions of an associated aircraft.

Modern aircraft are becoming more sophisticated and require precise information. Controls for modern aircraft must know an air speed with accuracy. As part of determining the air speed, an air data probe is often mounted on an aircraft body.

Air data probes take in air and evaluate that air to determine air speed and other parameters (as examples, altitude, angle of attack, angle of sideslip of an aircraft carrying the probe, etc.).

The requirements for such air data probes are challenging, especially when utilized in environments including ice crystals. Also, when an associated aircraft is operating at a pronounced angle of attack, air recirculation and boundary layers separation may incur within an opening or tap into the air data probe. For the air data probe to provide accurate information, total pressure recovery requirements remain unchanged and, thus, the air recirculation and boundary layer separation raise challenges.

The air data probe typically includes a pitot tube which provides the tap for receiving the air. The challenges mentioned above with regard to recirculation and boundary layer separation occur adjacent to the pitot tube tap.

SUMMARY OF THE INVENTION

An air data probe has a pitot tube with a tap at a forward end that defines an inner flow path. The inner flow path decreases in the cross-sectional area until reaching a throat. The inner flow path has cross-sections that are generally cylindrical and also has sections of removed material. Other embodiment have unique shapes.

These and other features may be best understood from the following drawings and specification.

DETAILED DESCRIPTION

Figure 1A:
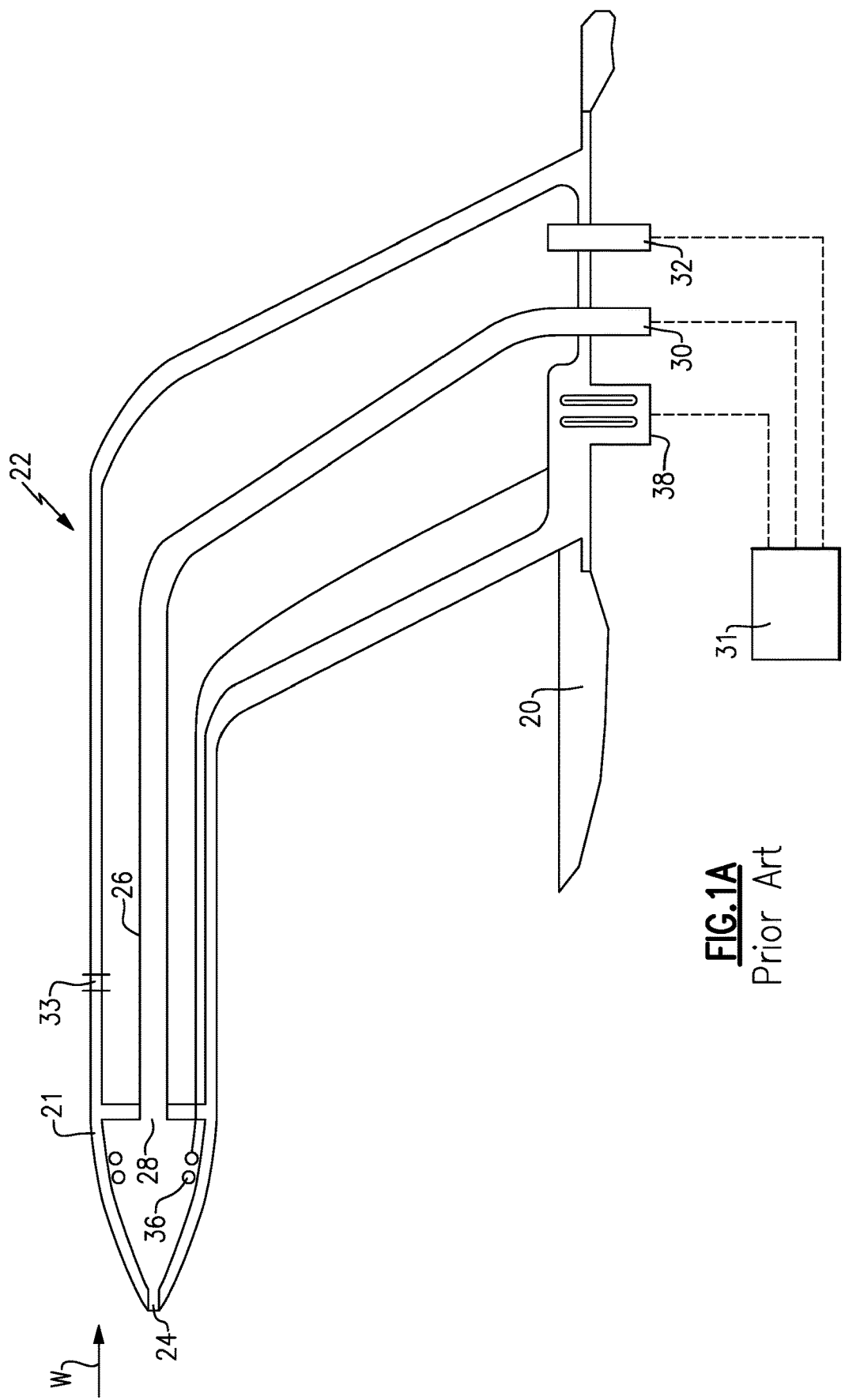
FIG. 1A shows an existing air data probe mounted on an aircraft.

FIG. 1A shows an aircraft body 20 schematically. An air data probe 22 is mounted to the aircraft body 20. The air data probe 22 has a tap 24 in a pitot tube 21 at a forward end. The tap 24 samples a portion of air W as the aircraft moves through the air. The tapped air will move into an opening 28 in a passage 26, and to a pressure tap 30. Pressure tap 30 is shown communicating with a control 31. Control 31 translates the tapped pressure into an air speed of the aircraft body 20. In addition, a static pressure tap 32 is utilized and communicates to the control 31. A hole 33 provides a tap to communicate air to the static pressure tap 32. Since the air data probe 22 may be utilized in environments having ice, heater elements 36 are provided. An electric heater connection 38 communicates to the control 31 and provides electric power to the heater element 36.

Figure 1B:
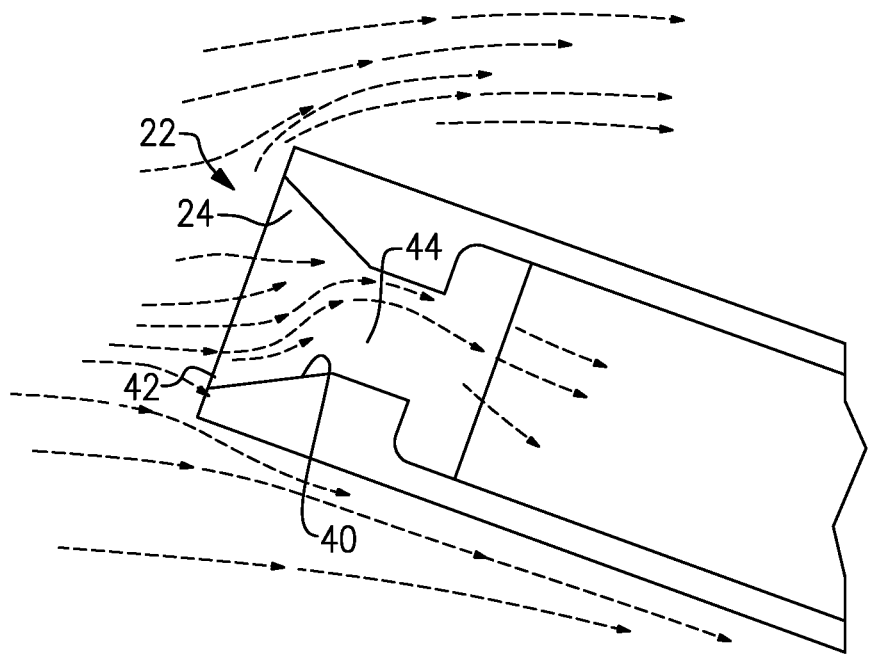
FIG. 1B shows an operational challenge with the existing air data probes.

As shown in FIG. 1B, the existing air data probe 22 has the tap 24 leading from an outermost end 42 inwardly to a throat 40. As shown, the air data probe 22 is at an angle that is relatively pronounced compared to the flight path. At such operation, a pronounced angle of attack, the air entering the tap 24 may have a recirculation region 44. There is also boundary layer separation. When this occurs, it becomes more difficult to obtain an acceptable total pressure.

Figure 2C:
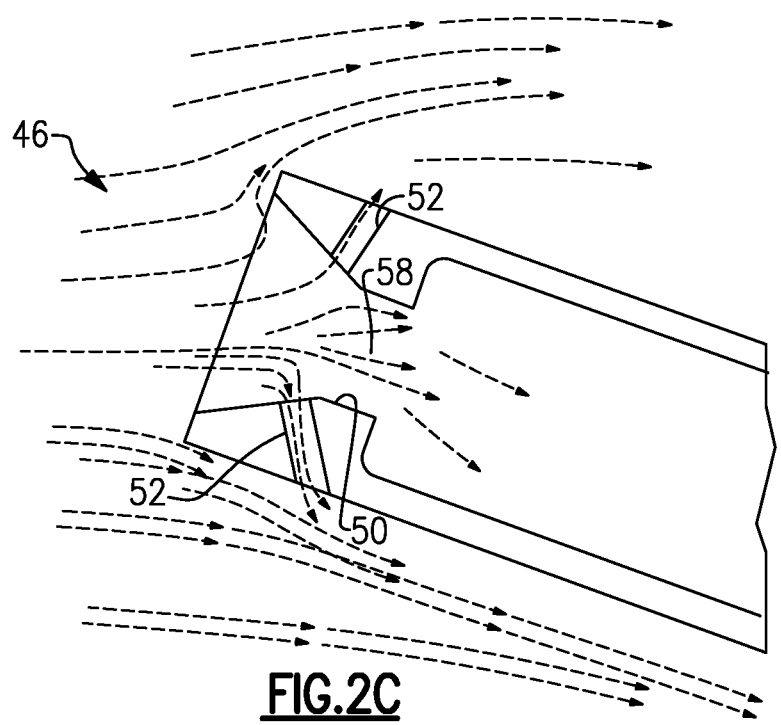
FIG. 2C illustrates an operational benefit of the FIG. 2A embodiment.
Figure 2A:
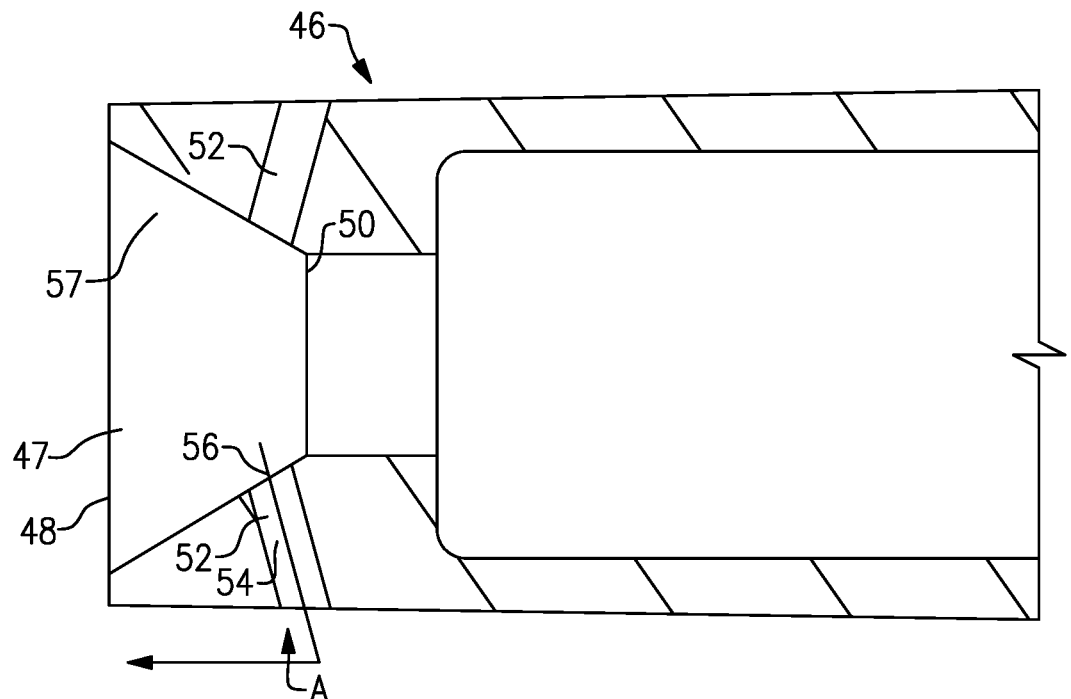
FIG. 2A shows a first embodiment.

FIG. 2A shows an air data probe 46 wherein the tap 47 extends from an outer end 48 inwardly toward a throat 50. A plurality of bleed holes 52 extend through a body of the air data probe 46 from an outlet 54 at an outer peripheral surface to an inlet 56 at an inner surface 57. Inner surface 57 of the air data probe 46 extends from the outer end 48 at an angle that decreases the cross-sectional area of an inner flow path as it moves inwardly until it reaches the throat 50. The bleed hole 52 has inlet 56 upstream of the throat 50.

Figure 2B:
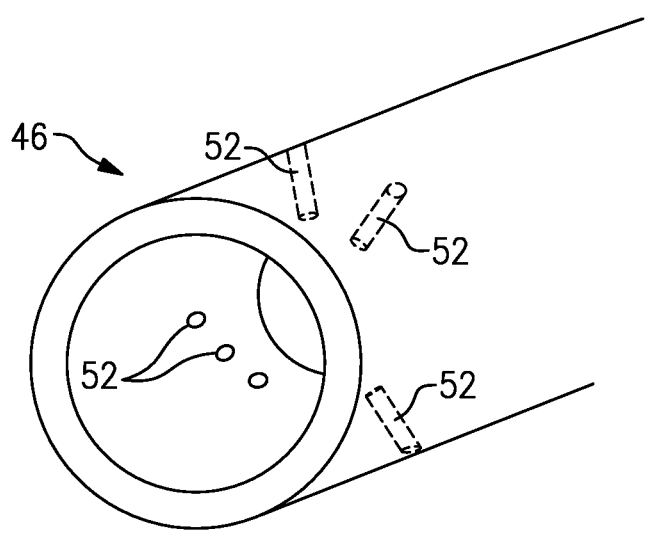
FIG. 2B is another view of the first embodiment.

FIG. 2B is a view showing a plurality of bleed holes 52. The quantity, size and location of the bleed holes 52 may be selected for specific operation in a particular environment.

FIG. 2C shows the operation of the air data probe 46. Air entering through the bleed holes 52 leaves the inner flow path, eliminating the recirculation and boundary layer separation illustrated in FIG. 1B. As shown, there is now uniform flow.

Figure 3A:
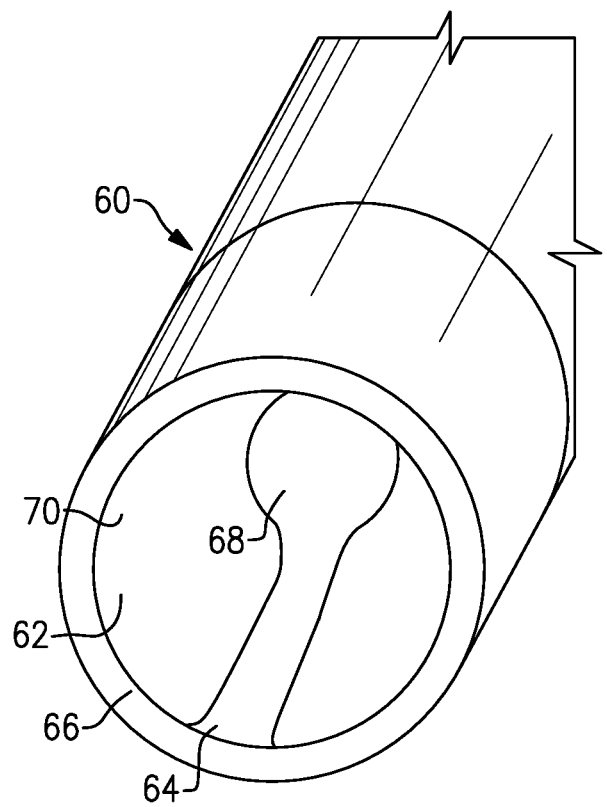
FIG. 3A shows a second embodiment.

FIG. 3A shows an embodiment 60 wherein the tap 62 has a forward end 66 with a fluted slot with a circumferentially thin portion 64 leading into a circumferentially enlarged opening 68. Other areas 70 of the tap 62 do not have the slots 64/68.

Figure 3B:
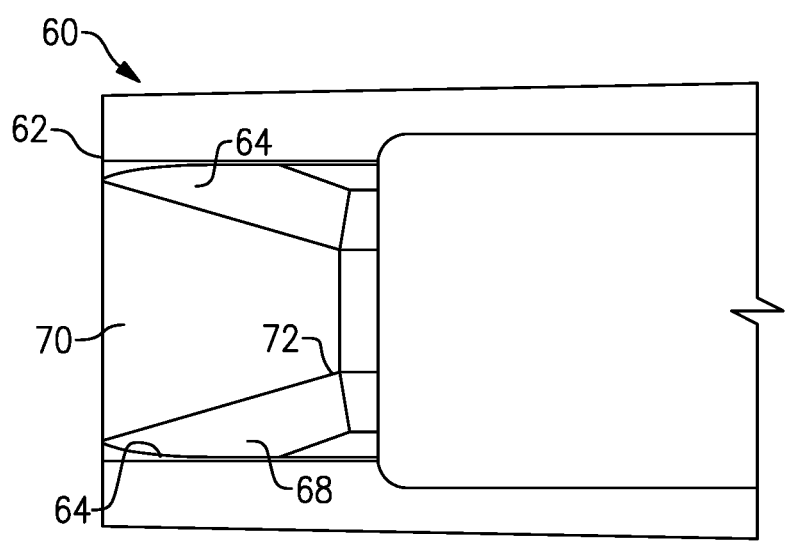
FIG. 3B is a cross-sectional view through the second embodiment.

As shown in FIG. 3B, there are slots 64/68 on opposed sides with intermediate generally cylindrical portions 70. Notably, the slots 64/68 end at the throat 72.

The slots 64/68 assist in bringing air in to reduce recirculation and boundary layer separation, similar to the FIG. 2A-2C embodiment.

Generically, the FIGS. 2A-2C and FIGS. 3A, 3B embodiments could be said to have removed material to assist in providing additional air pressure.

The FIGS. 2A-2C, and FIGS. 3A/3B embodiment could be said to have a pitot tube with a tap at a forward end, and defining an inner flow path. The inner flow path decreases in cross-sectional area until reaching a throat. The inner flow path has cross-sections which are generally cylindrical, and also has sections of removed material (bleed holes 52 or slots 64/68).

Figure 4:
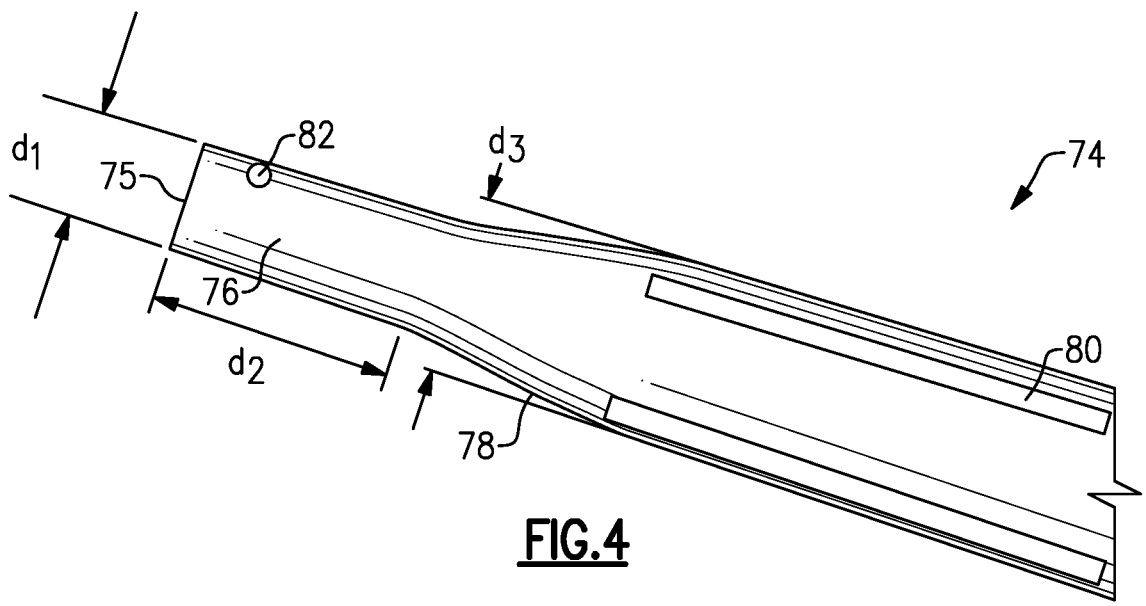
FIG. 4 shows a third embodiment.

FIG. 4 shows yet another embodiment 74. Embodiment 74 could be seen as a "long nose" air data probe. A nose 76 is provided with a relatively small diameter $d_1$. The diameter $d_1$ extends through a long nose that is generally straight or slightly tapered across a distance $d_2$. At an enlarged area 78, the diameter begins to increase to provide room for receiving a heater element 80. The enlarged area 78 is at a diameter $d_3$. A bleed hole 82 may be incorporated much like the FIG. 2A-2C embodiments.

In embodiments, a relationship exists between the ratio of $d_1/d_3$ to $d_2$. The $d_3$ quantity is controlled by physical characteristics of the probe tube and the heater element 80. The $d_1$ quantity is controlled by environmental conditions in which the probe is required to operate.

A ratio of $d_1$ to $d_3$ identifies how long $d_2$ should be. Applicant has discovered a constant that is associated with the relationship of the three quantities. Thus, the following relationship preferably applies:

$$(d_1/d_3)*1.26=d_2$$

The 1.26 constant in this equation is what is determined for a standard pitot probe similar to the one shown in the Figures of this application. The three quantities will generally meet this relationship in a disclosed embodiment. The term "generally" as used in this context would mean +/1 five percent (5%) of 1.26.

The long length nose 76 combines the small diameter opening 75 to increase the operation of the air data probe 74.

Figure 5:
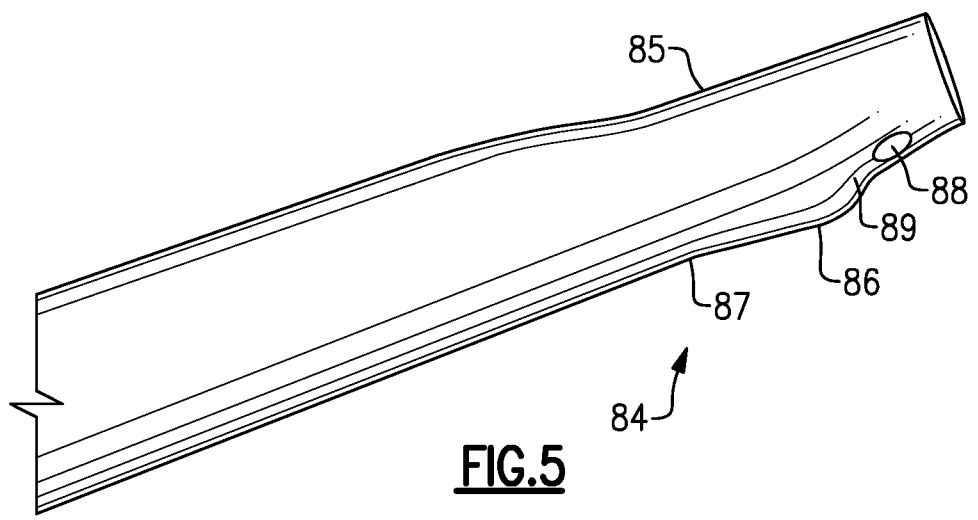
FIG. 5 shows a fourth embodiment.

FIG. 5 shows yet another embodiment 84. An optional bleed hole 88 is also shown.

An outer end of the probe 84 has a relatively flat outer surface 85 on a portion of its outer circumference and a bulged portion extending outwardly away from the flat surface and then merging inwardly such that the bulged portion provides an outer diameter portion spaced further from the flat portion, then do portions both rearwardly 87 and forwardly 89 of the bulged portion.

In addition, the air data probe 84 with bulged portion 86 provides a valuable test device. The bulged portion 86 may be rotated about an axis of the air data probe at multiple angles. Total pressure recovery may be checked at each and compared to others to determine low and high pressure points.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An air data probe comprising:
a pitot tube having a tap with a forward end, and defining an inner flow path, the inner flow path decreasing in cross-sectional area until reaching a throat;
said inner flow path having cross-sections which are cylindrical, and also having sections of removed material;
wherein said removed material includes a plurality of slots, with said cylindrical sections circumferentially spaced between said slots; and
wherein air downstream of said throat moving into a passage, and to a pressure tap, said pressure tap in communication with a control, said control programmed to translate a tapped pressure into an air speed of an associated aircraft body.

2. The air data probe as set forth in claim 1, wherein the elimination of air from the inner flow path to the outer periphery, and outwardly of the pitot tube eliminating a recirculation and boundary layer separation.

3. The air data probe as set forth in claim 1, wherein said plurality of slots have a relatively circumferentially thin portion adjacent the forward end of said pitot tube and relatively circumferentially enlarged portions downstream of said relatively thinner portion.

4. An air data probe comprising:
a pitot tube having a tap with a forward end, and defining an inner flow path, the inner flow path decreasing in cross-sectional area until reaching a throat;
said inner flow path having cross-sections which are cylindrical, and also having sections of removed material;
said removed material includes a plurality of slots, with said cylindrical sections circumferentially spaced between said slots; and
wherein said plurality of slots having a relatively circumferentially thin portion adjacent the forward end of said pitot tube and relatively circumferentially enlarged portions downstream of said relatively thinner portion.

5. The air data probe as set forth in claim 4, wherein said plurality of slots end at said throat.

6. The air data probe as set forth in claim 4, wherein air downstream of said throat moving into a passage, and to a pressure tap, said pressure tap in communication with a control, said control programmed to translate a tapped pressure into an air speed of an associated aircraft body.

* * * * *